United States Patent [19]

Kikuchi et al.

[11] Patent Number: 5,195,007

[45] Date of Patent: Mar. 16, 1993

[54] ENGINE-DRIVEN POWER GENERATING SYSTEM

[75] Inventors: Shinji Kikuchi; Toshihiko Tanuma; Yasuyuki Saito, all of Gunma, Japan

[73] Assignee: Daihatsu Motor Co., Ltd., Osaka, Japan

[21] Appl. No.: 706,966

[22] Filed: May 29, 1991

[30] Foreign Application Priority Data

May 29, 1990 [JP] Japan .................................. 2-139282

[51] Int. Cl.⁵ ............................................ H02H 7/06
[52] U.S. Cl. ...................................... 361/21; 361/24; 361/25; 361/82; 361/84
[58] Field of Search ........................ 361/15, 21, 24, 25, 361/82, 84, 91, 95, 93

[56] References Cited

U.S. PATENT DOCUMENTS

| 4,833,563 | 5/1989 | Russell ................................. 361/92 |
| 4,956,741 | 9/1990 | Murphy et al. ........................ 361/95 |

Primary Examiner—Jeffrey A. Gaffin
Attorney, Agent, or Firm—McGlew and Tuttle

[57] ABSTRACT

An engine-driven power generating system comprising a bridge circuit section in which a low-frequency switching elements driven alternately by low-frequency drive signals, and high-frequency switching elements driven by high-frequency drive signals during the ON period of the low-frequency switching elements are connected in a bridge network, and an inverter circuit section having a drive signal supply circuit for supplying low-frequency and high-frequency drive signals are each supplied to the low-frequency and high-frequency switching elements that form a pair; the a-c voltage generated by an engine-driven a-c generator is converted into d-c voltage that is in turn converted into a predetermined level of low-frequency a-c voltage; characterized in that an emergency relay circuit device for protecting the engine-driven power generating system against abnormal operating condition.

6 Claims, 15 Drawing Sheets

ENGINE-DRIVEN POWER GENERATING SYSTEM

BACKGROUND OF THE INVENTION

This invention relates generally to an engine-driven power generating system, and more particularly to an engine-driven power generating system for rectifying the a-c output generated by an a-c generator driven by an engine into d-c power that is in turn converted into a predetermined level of low-frequency a-c voltage using an inverter circuit driven by a pulse-width modulated (PWM) signal; and having an emergency relay circuit device for protecting the engine-driven power generating system against abnormal operating condition.

DESCRIPTION OF THE PRIOR ART

In an engine-driven a-c generator, the frequency it generates is dependent on the revolution of the engine. In order to stably produce an a-c voltage of a predetermined frequency, or a commercial frequency of 50 Hz or 60 Hz, for example, without being affected by changes in engine revolution, the a-c voltage generated by an a-c generator is converted into d-c voltage, which is in turn converted into an a-c voltage again using an inverter circuit.

An emergency relay circuit device is usually used in an engine-driven a-c generator. FIG. 1 is a diagram illustrating a prior-art emergency relay circuit device.

The emergency relay circuit of the prior art which operates at the time of engine abnormality including an abnormality in hydraulic pressure or water temperature in an engine-driven generator comprises an abnormal hydraulic pressure/water temperature engine-stop control circuit section, enclosed by a broken line 201 in FIG. 1, having a start delay function for stopping the engine when abnormal hydraulic pressure or water temperature is detected; an excess revolution engine-stop control circuit section, enclosed by a broken line 202, for stopping the engine when engine revolution exceeds a predetermined revolution; a starter disengagement control circuit section, enclosed by a broken line 203, for preventing the engine from being re-engaged at the time of engine start; a choke changeover control circuit section, enclosed by a broken line 204, for controlling the engine choke to automatic regulating or fully closed mode in accordance with the detected water temperature; a generator initial separate-excitation circuit section, enclosed by a broken line 205, for raising the voltage of the generator, and other circuit sections.

Needless to say, insulation resistance and dielectric strength tests are usually performed on a generator and other electrical equipment. Although there is no problem in carrying out these tests on a generator proper, the following problems may be caused when a generator winding insulation test is performed on an engine-driven generator assembly, including a control box incorporating an emergency relay circuit device and other electronic circuits. That is, the above-mentioned emergency relay circuit device has such a circuit configuration that the circuit device cannot be easily isolated from the generator winding circuit since the emergency relay circuit device is incorporated in the control box to take advantage of the output of the d-c windings of the generator to give full play to the functions of the circuit device.

For this reason, when an insulation test is performed, a high voltage might be applied to semiconductors, including ICs, in the emergency relay circuit device, causing damage to semiconductor elements.

Furthermore, the circuit configuration of the prior-art emergency relay circuit device as shown in FIG. 1 has the following drawbacks.

That is, since the emergency relay circuit device has no function to protect the circuit thereof should the battery 206 be connected with incorrect polarity, a reverse voltage may be applied, causing damage to semiconductors and other electronic components.

If a diode 221 as shown in FIG. 2 is connected to protect the battery 206 from reverse connection, the voltage applied to the normally connected relay Ry11 of the battery 206 may substantially drop due to a voltage drop in forward direction in the diode 221. This may result in a rise in the minimum working voltage of the emergency relay circuit device, reducing allowance for voltage drop given to the battery 206.

The emergency relay circuit device is protected against high surge voltage during generator operation by a surge absorber ZNR1 (as shown in the upper right part of FIG. 1). But there is no protective function against continuous application of an overvoltage of a medium magnitude from the battery 206, such as connection of a 24-V battery to the rated 12-V system.

In addition, electrical noises generated in the ignition coil during generator operation may be applied to the battery 206 due to the absence of a countermeasure against noises from the ignition coil. Thus, the electrical noises applied to the battery 206 may adversely affect control circuit systems.

SUMMARY OF THE INVENTION

This invention is intended to solve the aforementioned problems. It is an object of this invention to provide an engine-driven power generating system having an emergency relay circuit device adapted to avoid possible application of high voltage to the semiconductors, such as ICs, of the emergency relay circuit device caused at the time of dielectric strength test on the generator winding by electrically separating the emergency relay circuit device, particularly ICs and other semiconductor elements, from the generator winding, and to protect the emergency relay circuit device from accidental application of abnormal voltages.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE EMBODIMENT

Figure 1:
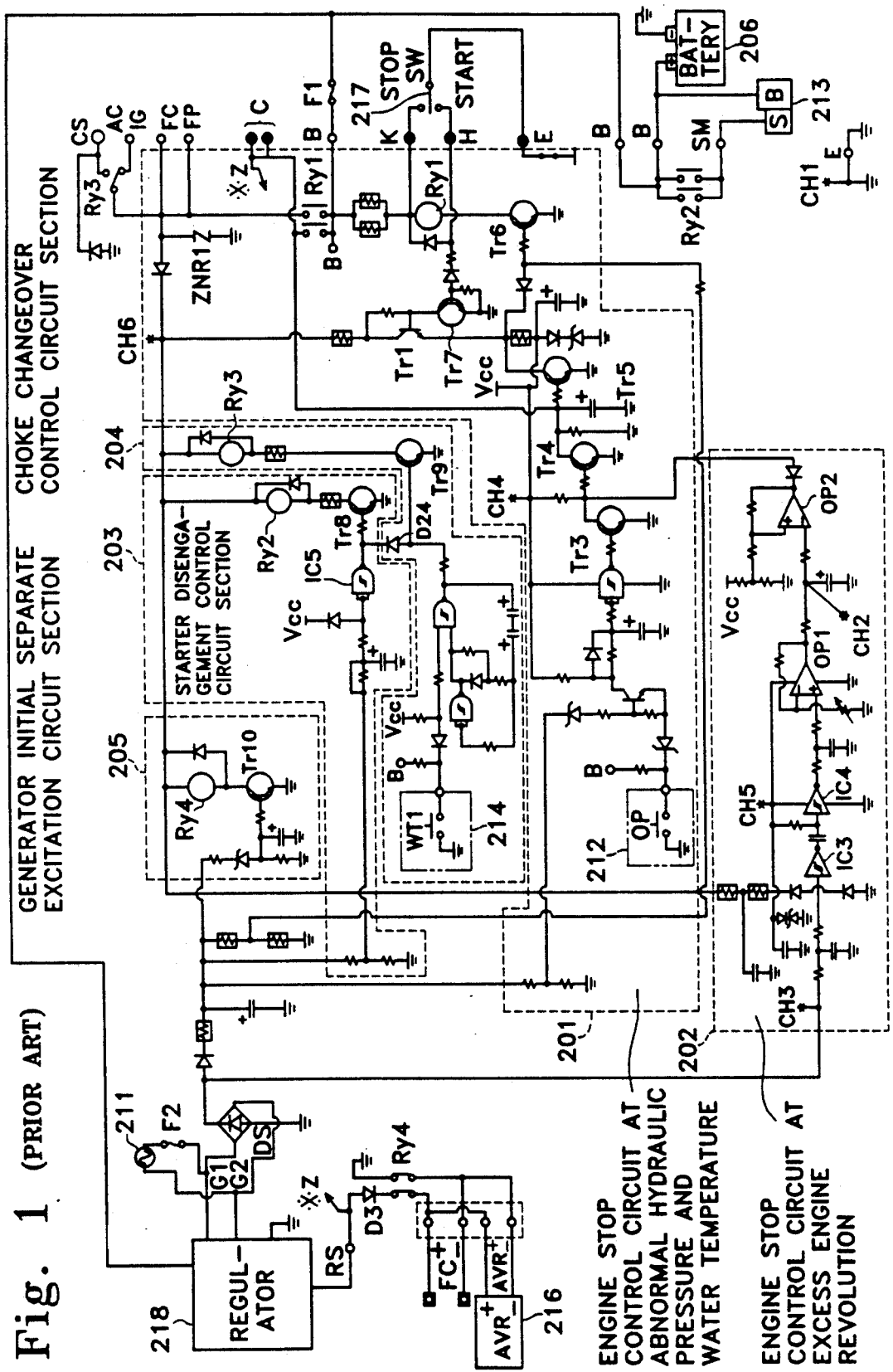
FIG. 1 is a diagram illustrating a prior-art emergency relay circuit device.
Figure 2:
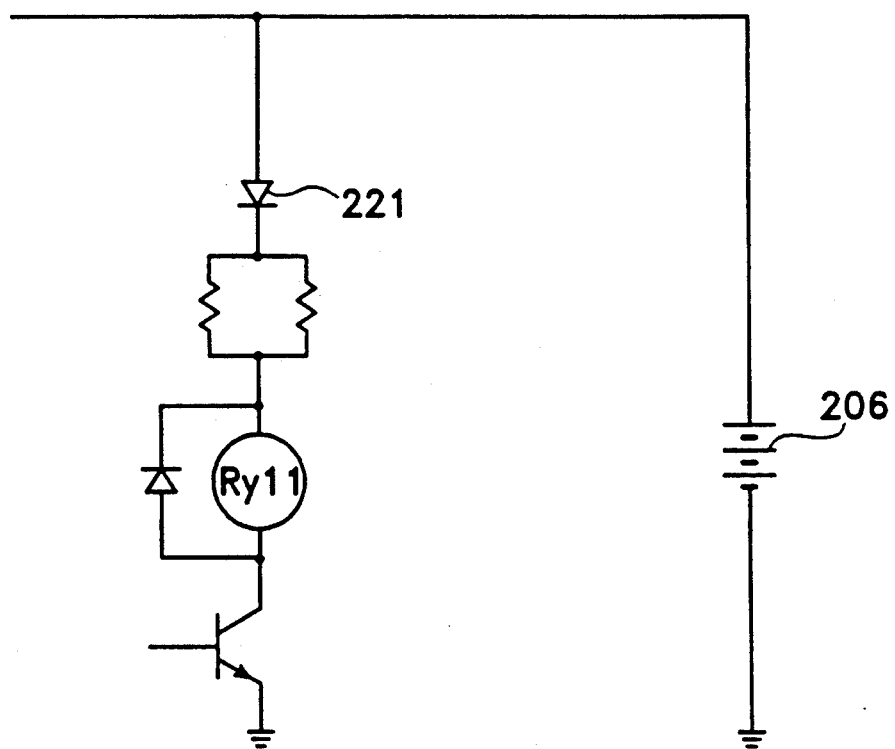
FIG. 2 is a diagram of assistance in explaining voltage drop for installing a battery reverse-connection protective circuit.
Figure 3:
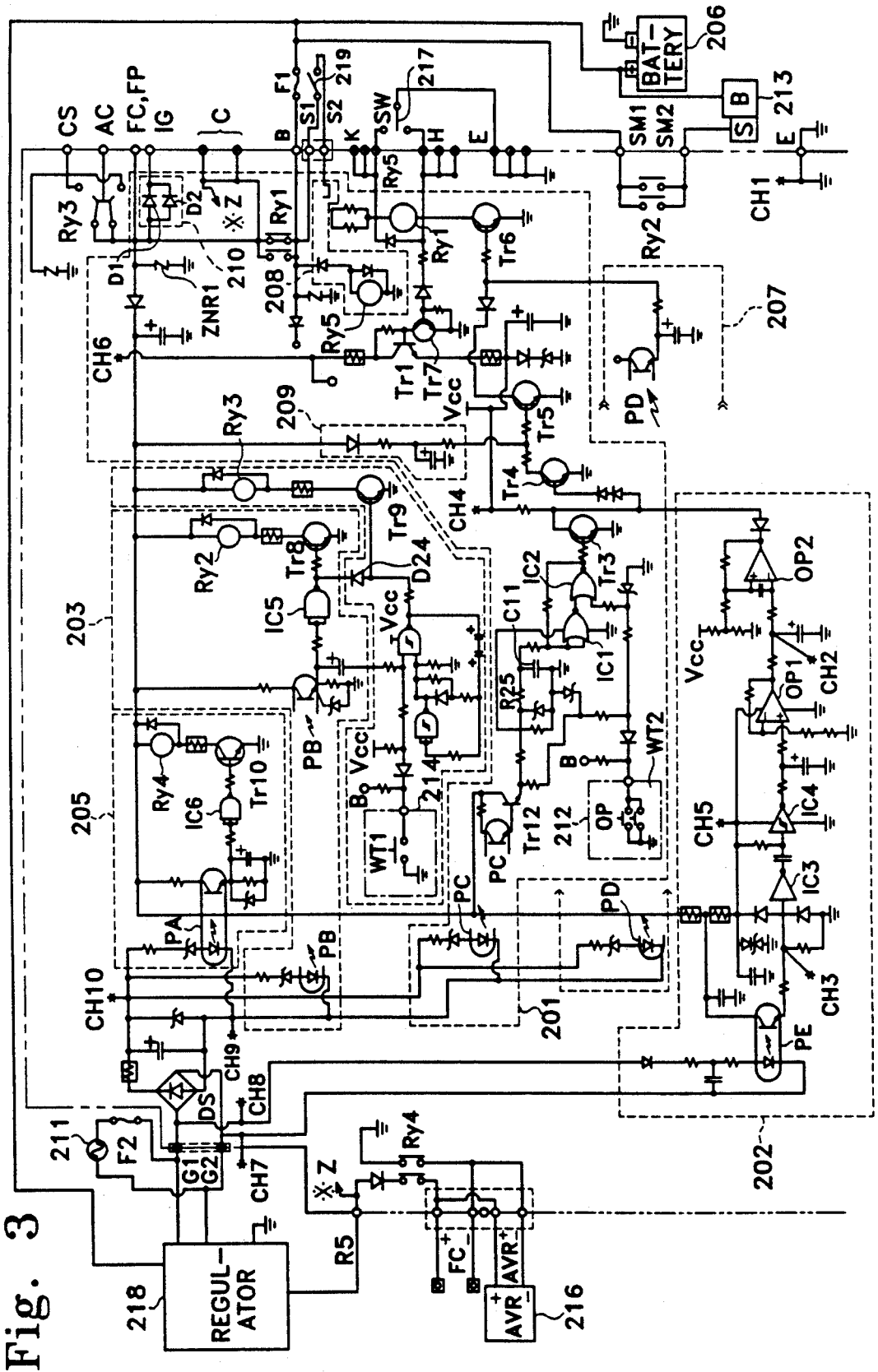
FIG. 3 is a diagram illustrating the circuit configuration of an embodiment of this invention.

FIG. 3 shows a typical construction of an emergency relay circuit device, in which the same parts and those having the same functions as shown in FIG. 1 are indicated by the same numerals.

Figure 4A:
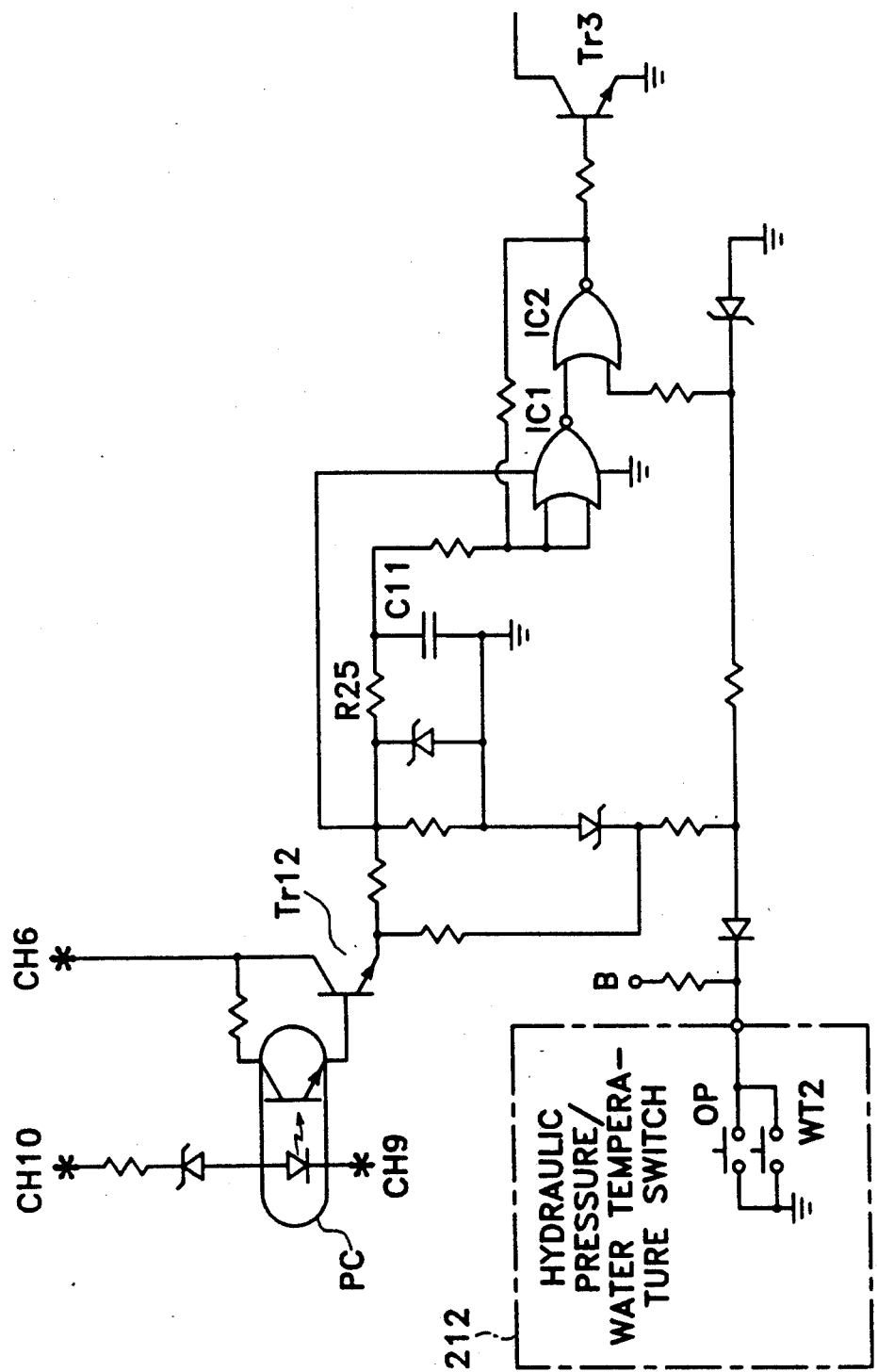
FIG. 4A is a diagram illustrating the construction of an embodiment of the hydraulic pressure/water temperature detecting circuit of this invention.
Figure 4B:
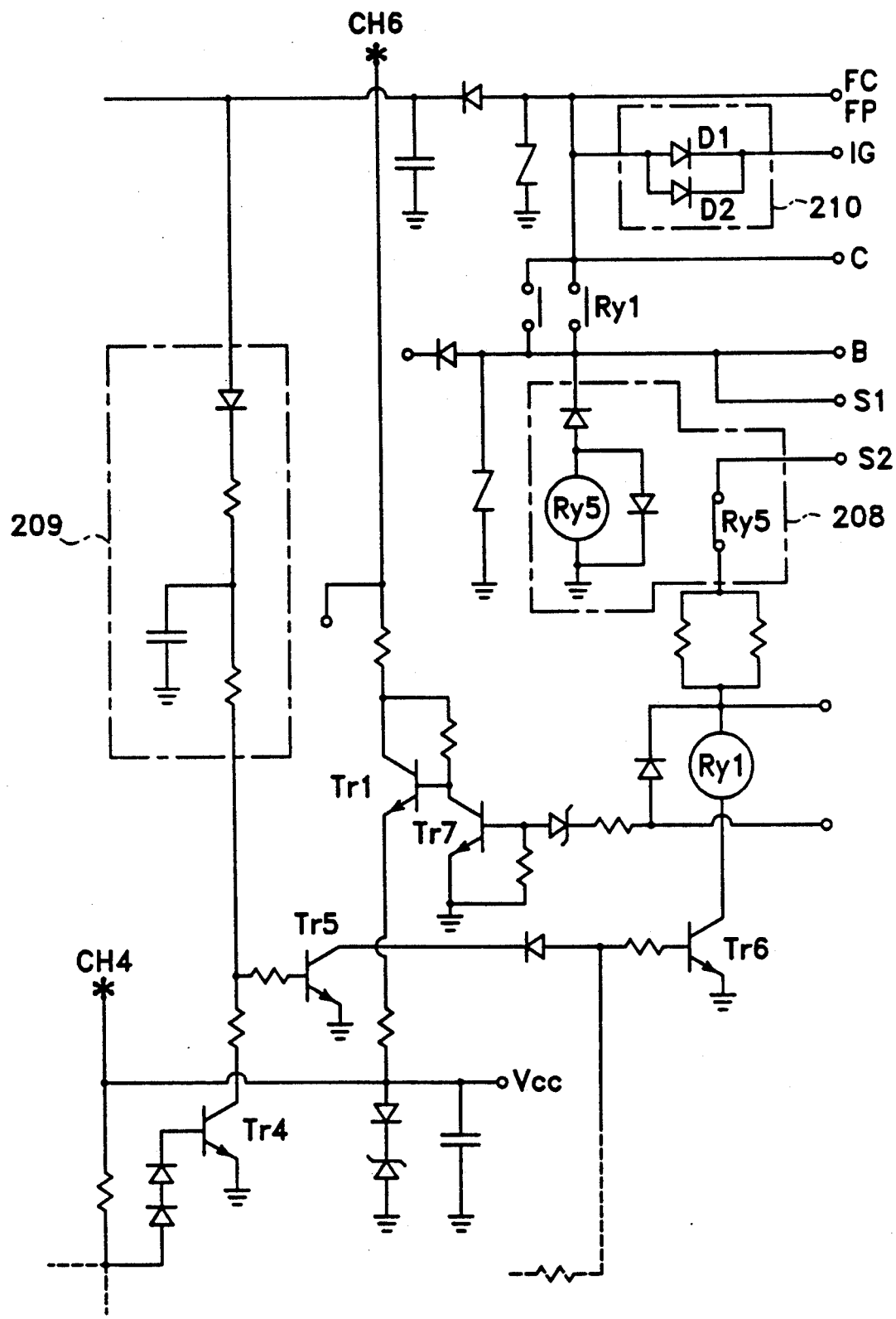
FIG. 4B is a diagram illustrating the construction of an embodiment of the engine-stop control circuit.
Figure 5:
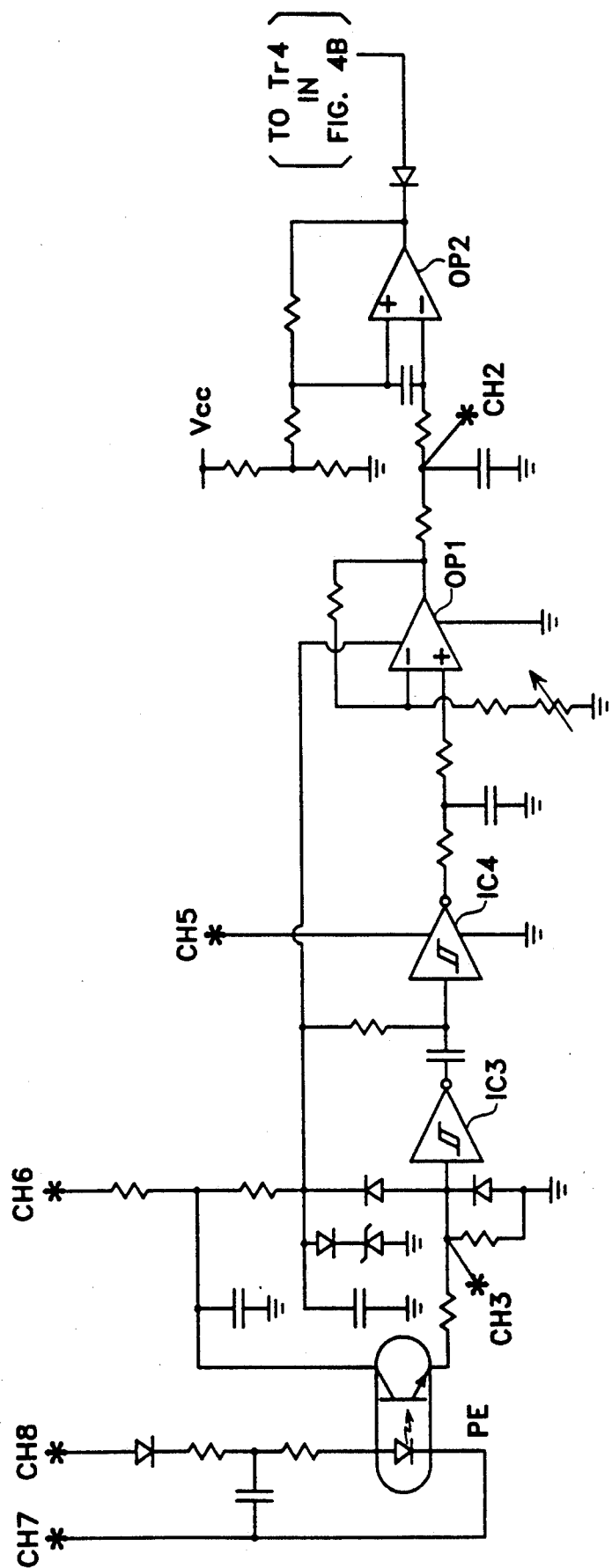
FIG. 5 is a diagram illustrating the construction of an embodiment of the excess revolution engine-stop control circuit section of this invention.
Figure 6:
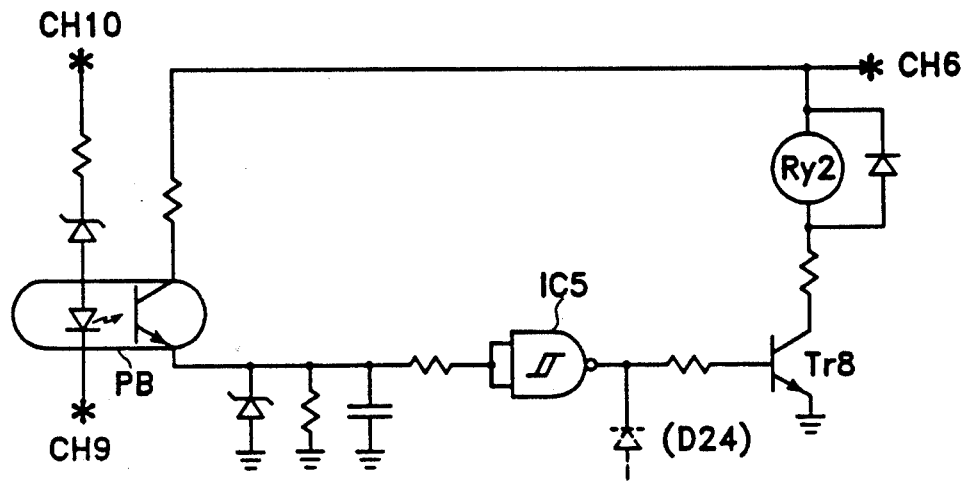
FIG. 6 is a diagram illustrating the construction of an embodiment of the starter disengagement control circuit section of this invention.
Figure 7:
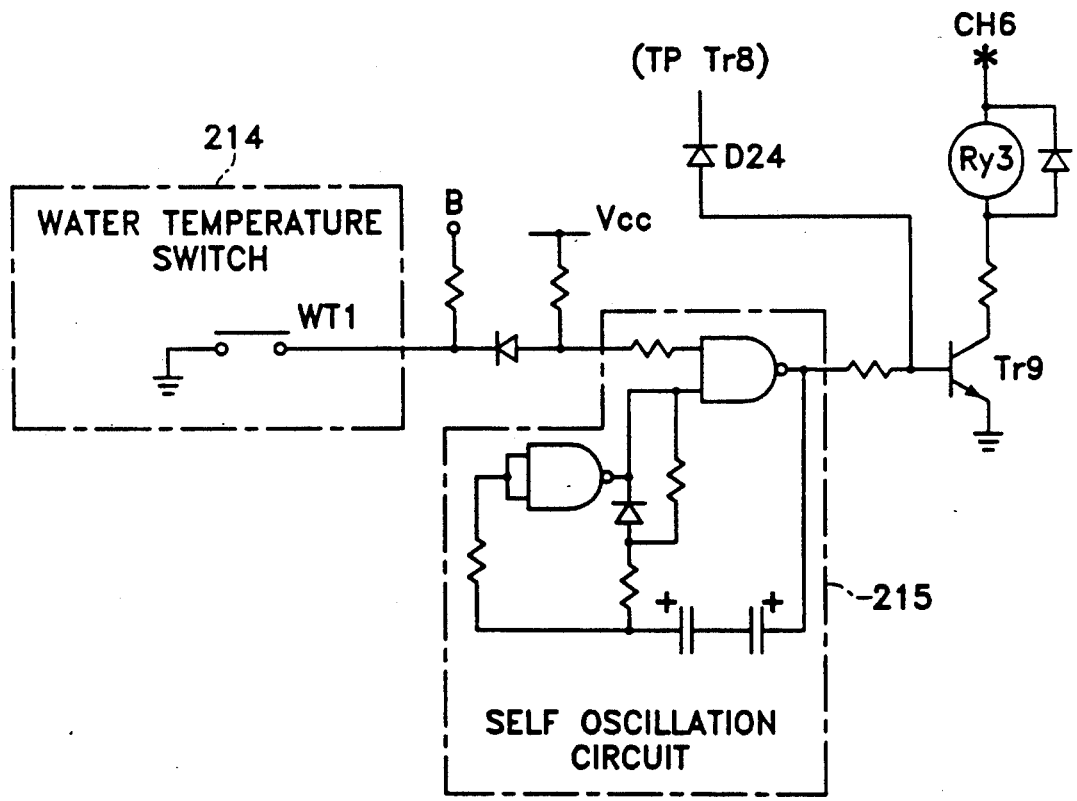
FIG. 7 is a diagram illustrating the construction of an embodiment of the choke changeover control circuit section of this invention.
Figure 8:
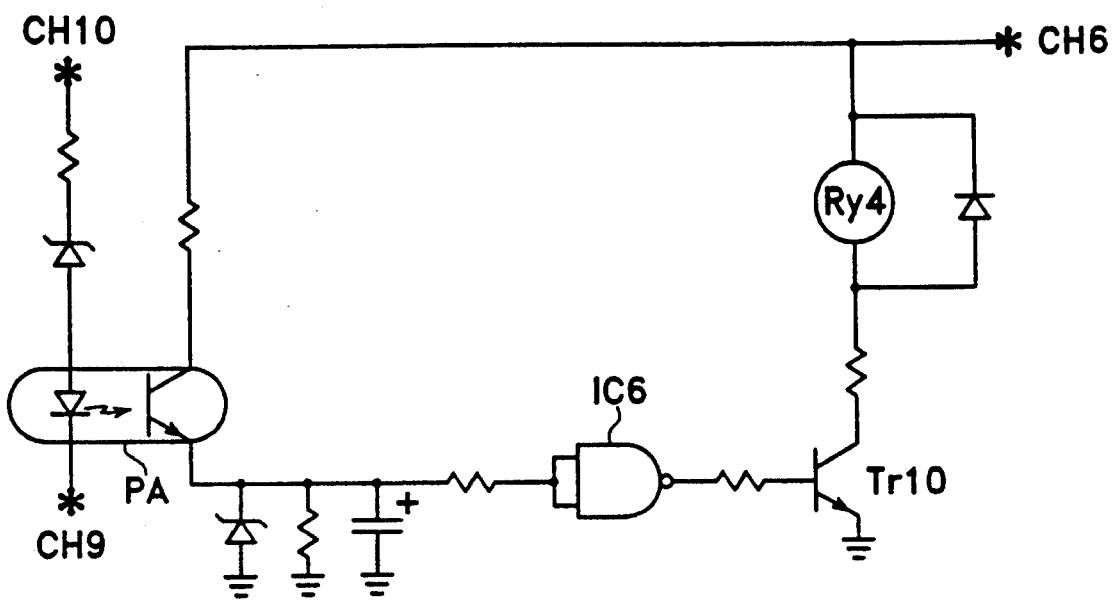
FIG. 8 is a diagram illustrating the construction of an embodiment of the generator initial separate-excitation circuit section of this invention.

In FIG. 3, the abnormal hydraulic pressure/water temperature engine-stop control circuit section, enclosed by broken line 201, is shown in FIGS. 4A and 4B; the excess revolution engine-stop control circuit section, enclosed by broken line 202, is shown in FIG. 5; the starter disengagement control circuit section, enclosed by broken line 203, is shown in FIG. 6; the choke changeover control circuit, enclosed by broken line 204, is shown in FIG. 7; and the generator initial separate-excitation circuit section, enclosed by broken line 205, is shown in FIG. 8, respectively.

Figure 9:
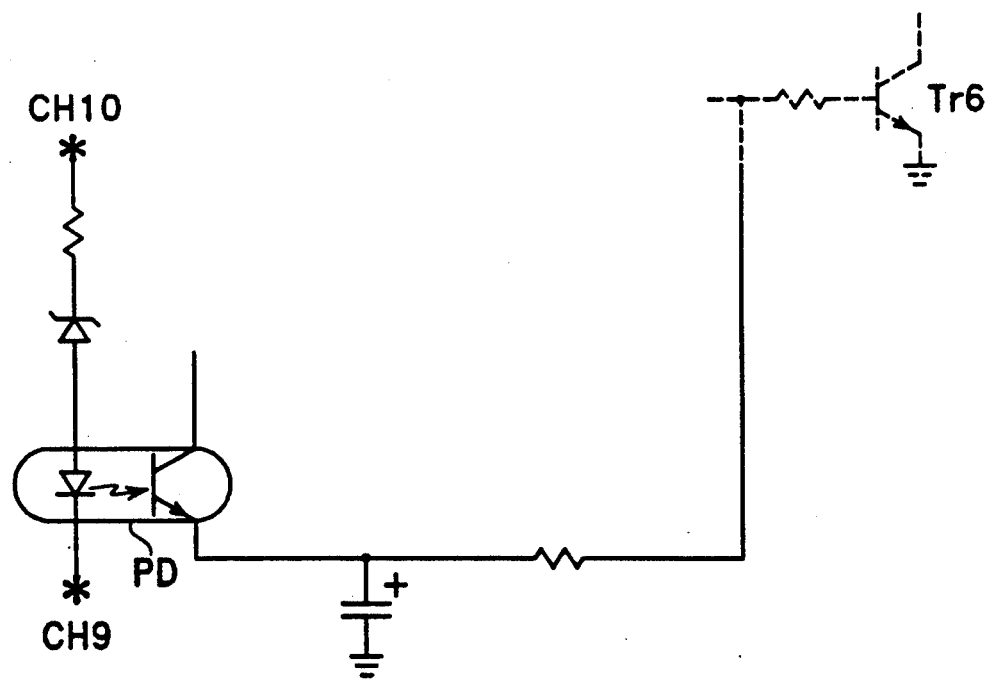
FIG. 9 is a diagram illustrating the construction of an embodiment of the latching circuit of this invention.

The latching circuit that is newly added to FIG. 3 enclosed by broken line 207, is shown in FIG. 9; the battery reverse-connection protective circuit, enclosed by broken line 208, the abnormal overvoltage protective circuit, enclosed by broken line 209, and the noise elimination circuit, enclosed by broken line 210 are shown in FIG. 4B.

In FIGS. 3, and 4A through 9, the abnormal hydraulic pressure/water temperature engine-stop control circuit section 201 is electrically isolated from the d-c winding 211 of the generator by a photocoupler PC, and the excess revolution engine-stop control circuit section 211 is also electrically isolated from the d-c winding 211 of the generator by a photocoupler PB, and the generator initial separate-excitation circuit section 205 is electrically isolated from the d-c winding 211 of the generator by a photocoupler PA, and the latching circuit 207 is electrically isolated from the d-c winding 211 of the generator by a photocoupler PD.

The choke changeover control circuit section 204 is electrically isolated from the d-c winding 211 of the generator by photocouplers PA through PE.

As various circuits in the emergency relay circuit device are electrically isolated from the d-c winding 211 of the generator in this way, even when dielectric strength tests are carried out on the generator windings, particularly, on the d-c winding 211, there is no danger of applying high voltage to ICs and other semiconductor elements in the circuits. Thus, these ICs and other semiconductor elements are protected from being damaged.

Figure 10:
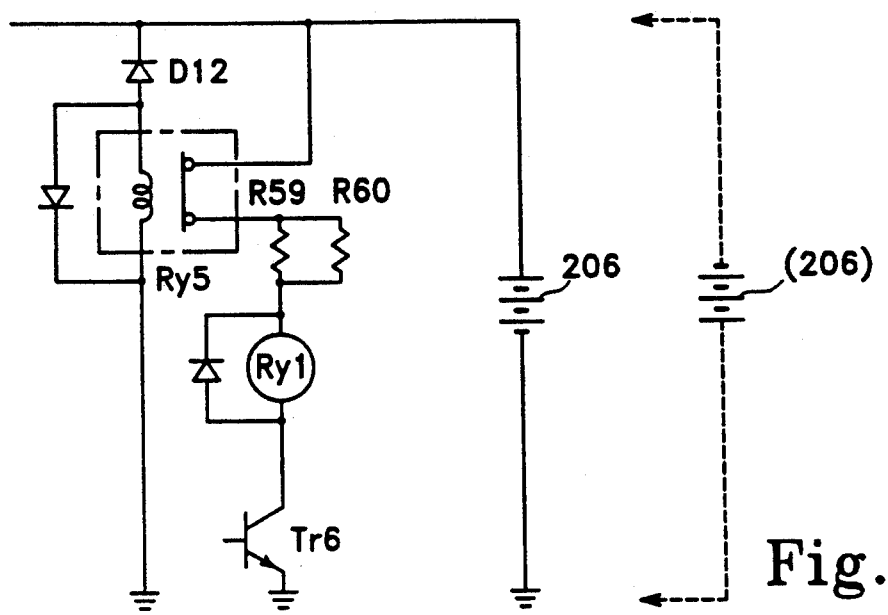
FIG. 10 is a diagram illustrating the construction of an embodiment of the battery reverse-connection protective circuit of this invention.

FIG. 10 is a circuit diagram of a battery reverse-connection protective circuit, which is excerpted from FIGS. 3 and 4B.

Any one end of the relay Ry5 is grounded, and the other end thereof is connected to the anode of the diode D12, the cathode of which is connected to the positive electrode of the battery 206. Any one of the normally closed contacts of the relay Ry5 is connected to the positive electrode of the battery 206, and the other contact is grounded via a parallel circuit of the resistors R59 and R60, the coil of the relay Ry1 and the transistor Tr6.

With this circuit configuration, if the battery 206 is connected normally, that is, as shown by solid lines in FIG. 10, the diode D12 prevents voltage from being applied to the coil of the relay Ry5, keeping the contacts of the relay Ry5 in the ON state.

Consequently, a predetermined voltage is applied to the coil of the relay Ry1, giving the relay Ry5 an allowance for minimum operation to cope with a voltage drop in the battery 206.

When the battery 206 is reverse-connected, as shown by broken lines in FIG. 10, the relay Ry5 is energized to break the contacts thereof, causing the relay Ry1 to be deenergized. This prevents power from being supplied to the emergency relay circuit device, as is apparent from FIG. 3. That is, the emergency relay circuit device is protected from the reverse voltage applied by the inadvertent reverse-connection of the battery 206.

Figure 11:
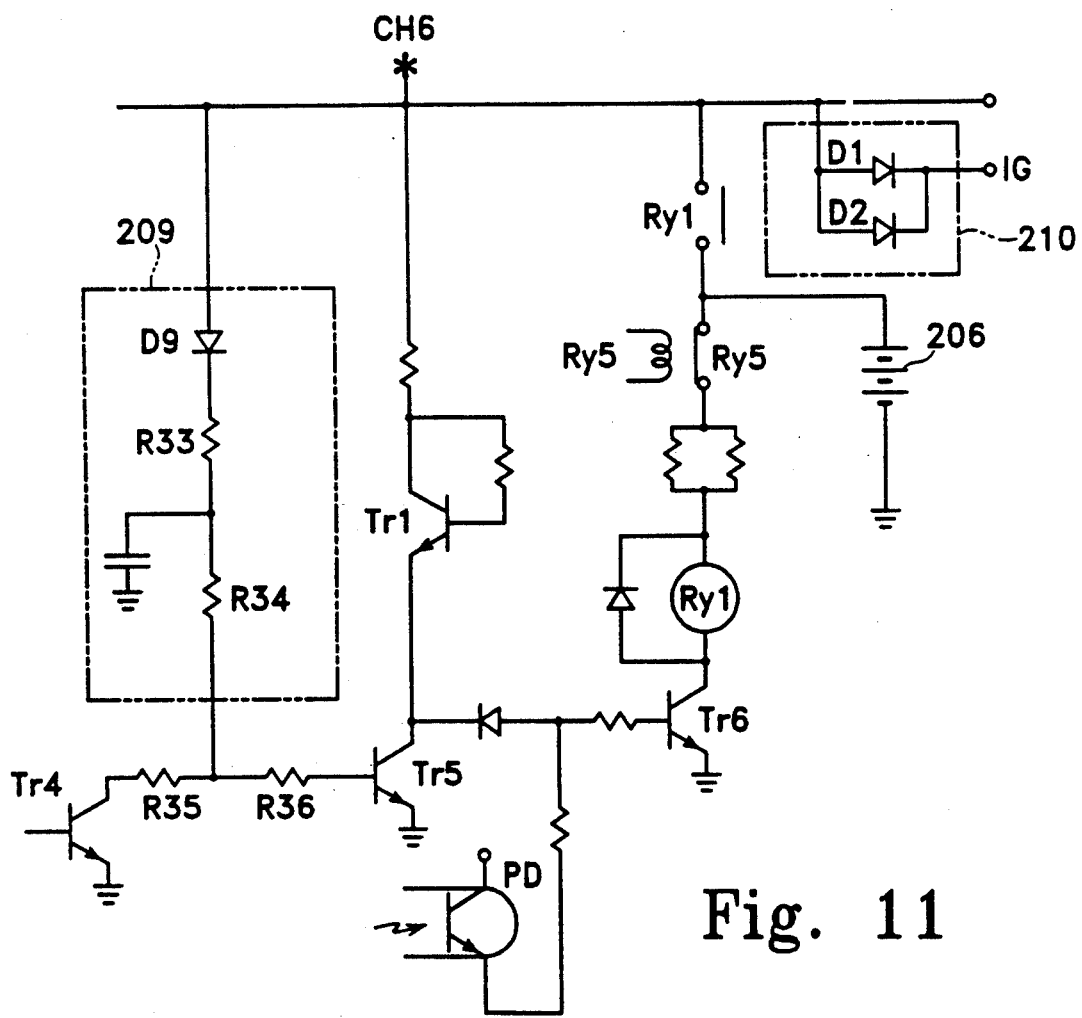
FIG. 11 is a diagram illustrating the construction of an embodiment of the abnormal overvoltage protective circuit and the noise elimination circuit of this invention.

FIG. 11 shows the circuit configuration of an abnormally excess voltage protective circuit and a noise elimination circuit, both excerpted from FIGS. 3 and 4B.

The abnormally excess voltage protective circuit 209 is connected between the connecting point of the resistors R35 and R36, and the voltage line CH6. The abnormally excess voltage protective circuit 209 is constructed so that voltage in the voltage line CH6 is applied to the connecting point of the resistors R35 and R36 via the resistors R33 and R34.

With the abnormally excess voltage protective circuit 209 having the aforementioned construction, if a 24-V battery is inadvertently connected in place of the battery 206 whose voltage is 12 V, the voltage in the voltage line CH6 rises above the normal voltage level. This raises the voltage at the connecting point of the resistors R35 and R36, causing a base current to flow in the transistor Tr5 through the resistor R36, turning on the transistor Tr5. With this, the transistor Tr6 is turned off, deenergizing the relay Ry1, breaking the contacts thereof. That is, as the contacts of the relay Ry1 which supplies the power voltage of the battery 206 to various circuits in the emergency relay circuit device are broken, the excess voltage of 24 V is prevented from being supplied to the emergency relay circuit.

Next, a noise elimination circuit 210 consisting of a parallel circuit of diodes D1 and D2 is connected between the ignition coil terminal IG and the voltage line CH6.

By connecting the diodes D1 and D2 as shown in FIG. 11, electrical noise generated in the ignition coil (not shown) is removed by the diodes D1 and D2 of the noise elimination circuit 210, protecting the battery 206 against adverse effects of noises. Along with this, the adverse effects of noises on the voltage line CH6 are also avoided. Thus, this arrangement serves as a measure for protecting the emergency relay circuit device against noises.

Next, the operation of each circuit of the emergency relay circuit device will be described, referring to FIGS. 3 and 4A.

FIG. 4A is a circuit diagram of a hydraulic pressure/water temperature detecting circuit, FIG. 4B showing an engine-stop relay control circuit.

As the engine is started and voltage is generated in the d-c winding 211, a d-c voltage appears across the voltage lines CH9 and CH10. When the d-c voltage exceeds a predetermined voltage level, the photocoupler PC is turned on, supplying power to the transistor Tr12 and other elements shown in FIG. 4A. The circuit configuration consisting of a delay circuit of the resistor R25 and the capacitor C11, and NOR circuits IC1 and IC2 is such that the transistor Tr3 is kept in the OFF state even if the hydraulic pressure/water temperature switch 212 is turned on, or closed, during a predetermined time interval after the engine is started.

If an abnormality in hydraulic pressure or water temperature occurs after the engine enters its steady-state operation, the hydraulic pressure/water temperature sensor detects the abnormality, turning on the corresponding switch OP or WT2 of the hydraulic pressure/water temperature switch 212. As the transistor Tr3 is turned off, the transistor Tr6 is also turned off via the transistors Tr4 and Tr5, deenergizing the relay Ry1 and breaking the contacts Ry1 thereof.

As a result, power to the battery 206 is cut off, causing the engine to stop.

FIG. 5 shows the circuit configuration of an excess revolution engine-stop control circuit section.

A voltage proportional to the revolution of the engine is generated, causing the photocoupler PE to be turned on and off in accordance with the frequency thereof. The half-wave rectified pulsating voltage obtained as a result of the on-off operation of the photocoupler PE is converted into a rectangular wave, which is shaped by the inverters IC3 and IC4, smoothed by the smoothing circuit, amplified by the amplifier OP1, and compared with a predetermined voltage by the comparator OP2. The input voltage from the amplifier OP1 to the comparator OP2, that is, the voltage generated in the d-c winding 211, that is the output of the comparator OP2 is reversed from the "H" level to the "L" level when engine revolution exceeds a predetermined revolution.

Since it is adapted that the output of the comparator OP2 is delivered to the transistor Tr4 shown in FIG. 4B, power to the battery 206 is cut off, causing the engine to stop, as described above. Thus, the engine is prevented from excess revolution.

FIG. 6 is a circuit diagram illustrating the configuration of a starter disengagement control circuit section.

As the starter is actuated to start the engine, and the engine reaches to a predetermined revolution, the d-c voltage generated between the voltage lines CH9 and CH10 based on the voltage produced in the d-c winding 211 causes the photocoupler PB to be turned on. As the photocoupler PB is turned on, the NAND circuit IC5 is turned to "L", deenergizing the relay Ry2 via the transistor Tr8. As the contacts of the relay Ry2 are opened, power to the starter 213 is cut off. Consequently, if engine revolution exceeds a predetermined level, the starter 213 is prevented from being adversely engaged again.

FIG. 7 is a circuit diagram illustrating the configuration of a choke changeover control circuit.

The water temperature sensor for detecting water temperature at the time of engine start turns on the water temperature switch 214 when water temperature is below 10° C., and turns off the water temperature switch 214 when water temperature is above 10° C.

When the water temperature at the start of engine is below 10° C., the water temperature switch 214 is kept in the ON state, so the self-oscillation circuit 215 does not work, causing the transistor Tr9 to conduct, energizing the relay Ry3 to throw the contacts thereof to the choke solenoid terminal CS.

When the water temperature at the start of engine is above 10° C., the water temperature switch 214 is turned off, causing the self-oscillation circuit 215 to operate, energizing or deenergizing the relay Ry3 via the transistor Tr9, alternately repeating the operation of throwing the contacts of the relay Ry3 to the choke solenoid terminal CS side for approximately 1.5 seconds, and to the auto solenoid terminal AC side for approximately 2 seconds. Since the base side of the transistor Tr9 is connected to the output side of the NAND circuit IC5 shown in FIG. 6 via the diode D24, if the starter disengagement control circuit section 203 is operated, that is, if the engine is actuated, control is effected so that the transistor Tr9 is turned off via the diode D24. Thus, the choke changeover control circuit 204 stops operating.

FIG. 8 is a circuit diagram illustrating the configuration of a generator initial separate-excitation circuit section.

The initial excitation of the field coil of the generator (not shown) is effected from the terminal of the field coil FC using the power voltage of the battery 206 via the contacts of the relay Ry4 which is in the ON state at the start of engine.

As the engine is started and reaches a predetermined revolution, the photocoupler PA is turned on by the d-c voltage between the voltage lines CH9–CH10 based on the voltage generated in the d-c winding 211. As the photocoupler PA is turned on, the NAND circuit IC6 is changed to "L", deenergizing the relay Ry4 via the transistor Tr10. As the contacts of the relay Ry4 are opened, the separate excitation from the battery 206 is changed to the self-excitation operated by the AVR 16 shown in FIG. 3.

FIG. 9 is a circuit diagram illustrating the configuration of a latching circuit, which is a circuit having a function newly added to FIG. 3.

As the engine is started and reaches a predetermined revolution, the photocoupler PD is turned on by the d-c voltage between the voltage lines CH9–CH10 based on the voltage generated in the d-c winding 211. The output voltage on the phototransistor side of the photocoupler PD is delivered to the base side of the transistor Tr6 which energizes the relay Ry1 shown in FIG. 4B. So, the circuit performs a function to latch the relay Ry1 when the engine reaches a predetermined revolution.

Needless to say, when detecting an abnormal hydraulic pressure, or excess engine revolution, the abnormal hydraulic pressure/water temperature engine-stop control circuit section 201 or the excess revolution engine-stop control circuit section 202 operates to deenergize the relay Ry1, causing the engine to stop.

In FIG. 3, reference numeral 217 refers to a start/stop switch; 218 to a regulator; and 219 to a main switch, respectively.

Figure 12:
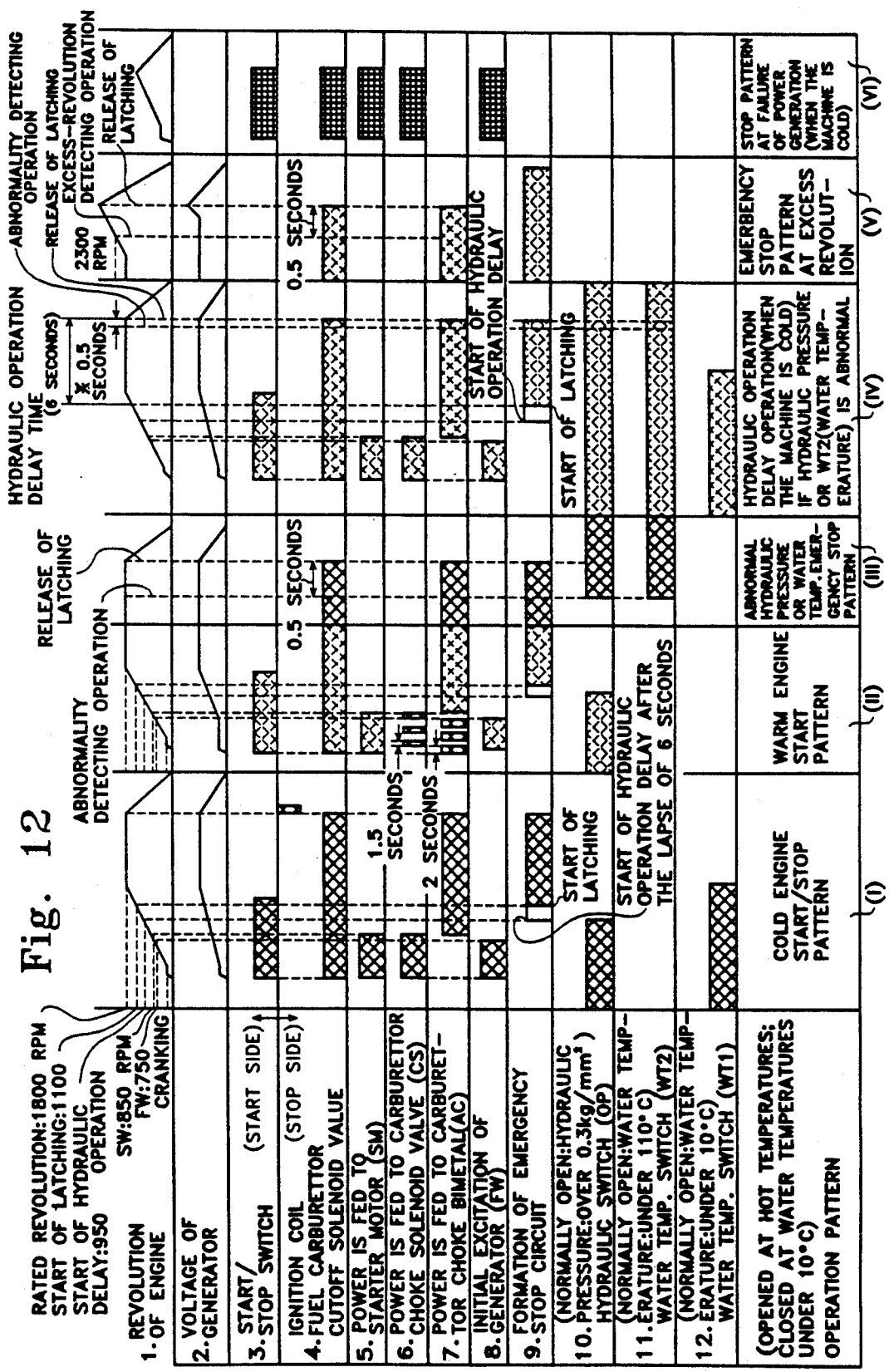
FIG. 12 is a timing chart of various operating patterns of an engine-driven generator using an emergency relay circuit device.
Figure 13A:
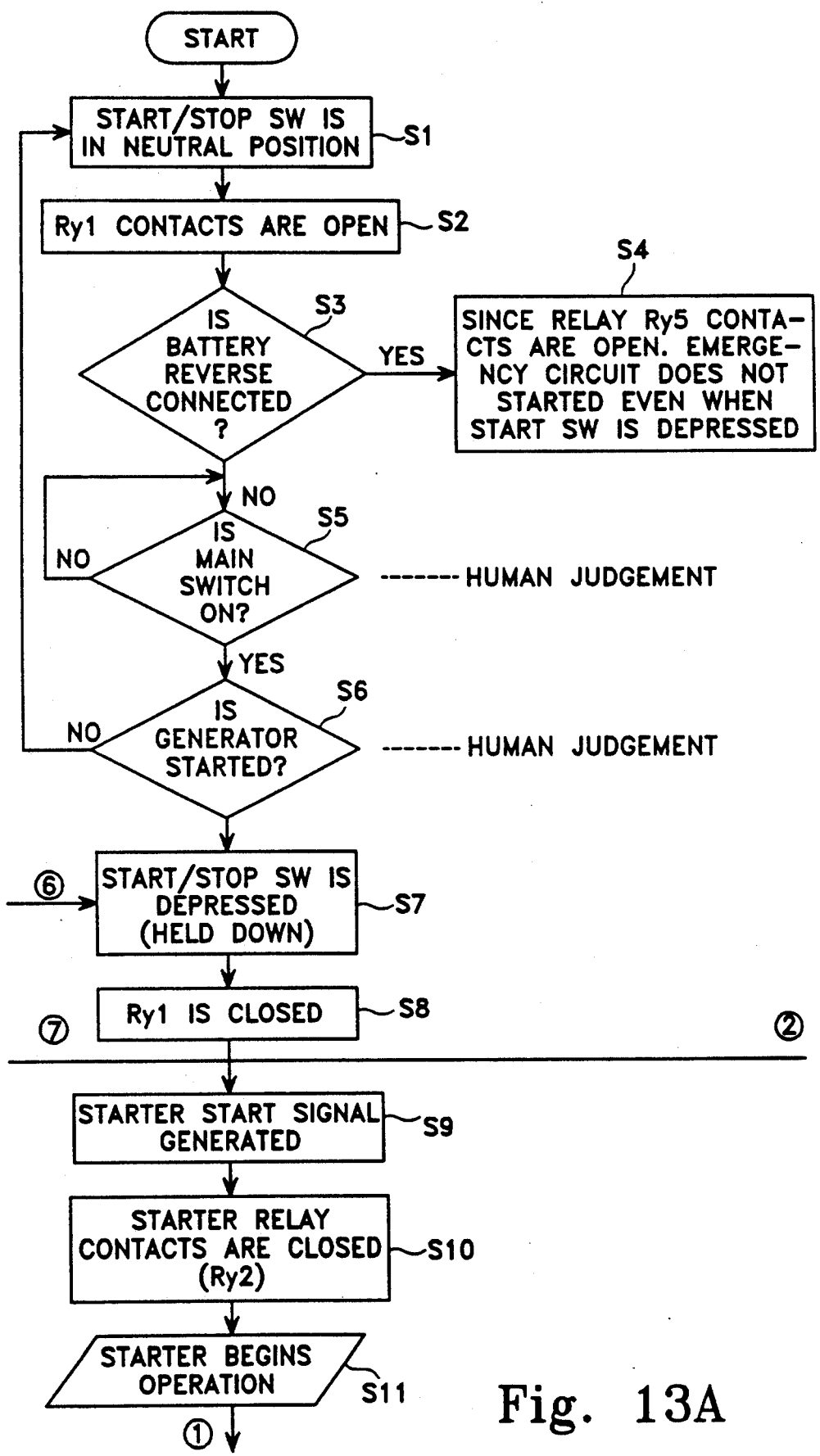
FIGS. 13A, 13B, 13C, 13D and 13E are flow charts, all of which constitute one drawing, for an embodiment of the engine-driven generator using the emergency relay circuit device.
Figure 13B:
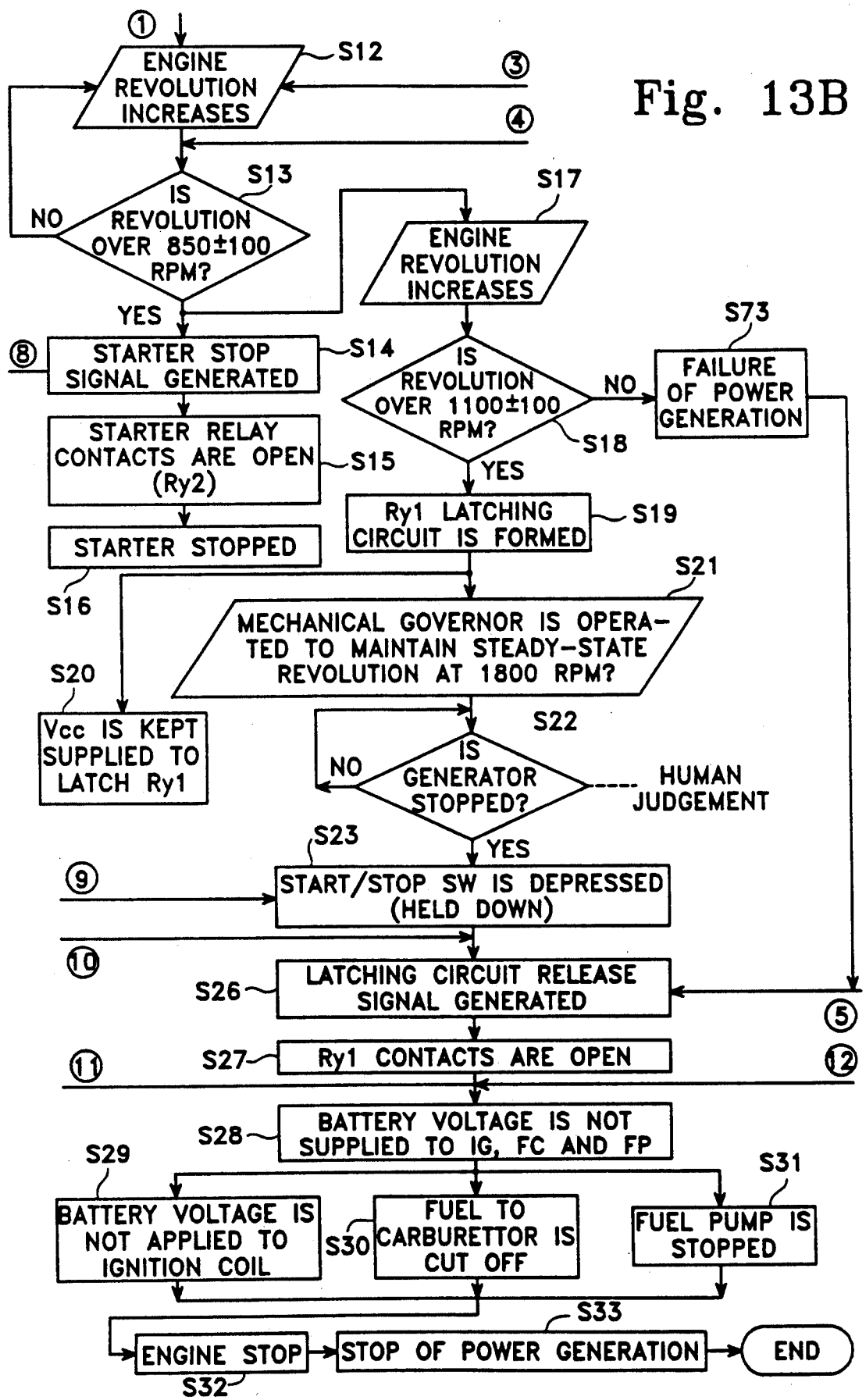
Figure 13C:
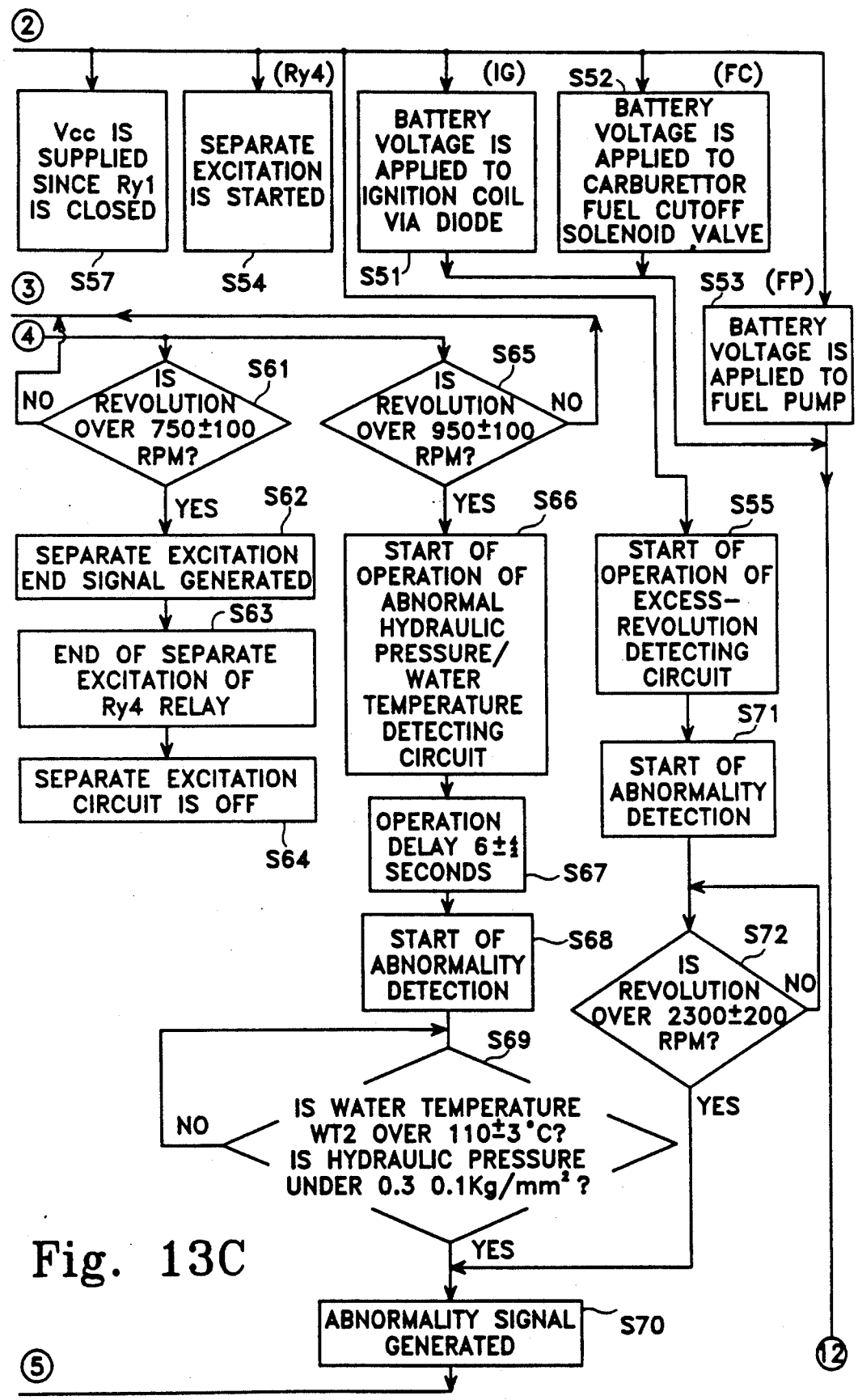
Figure 13D:
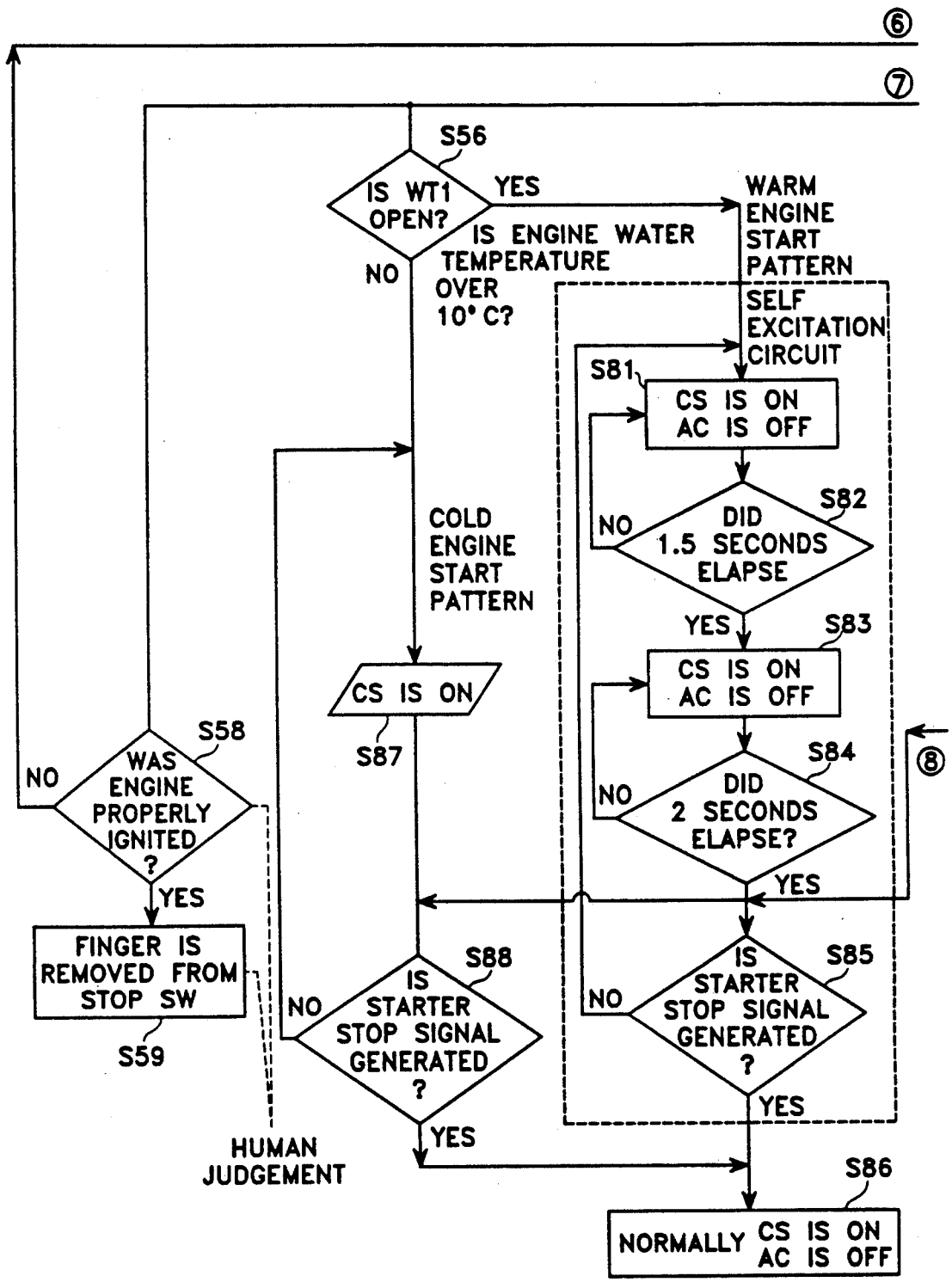
Figure 13E:
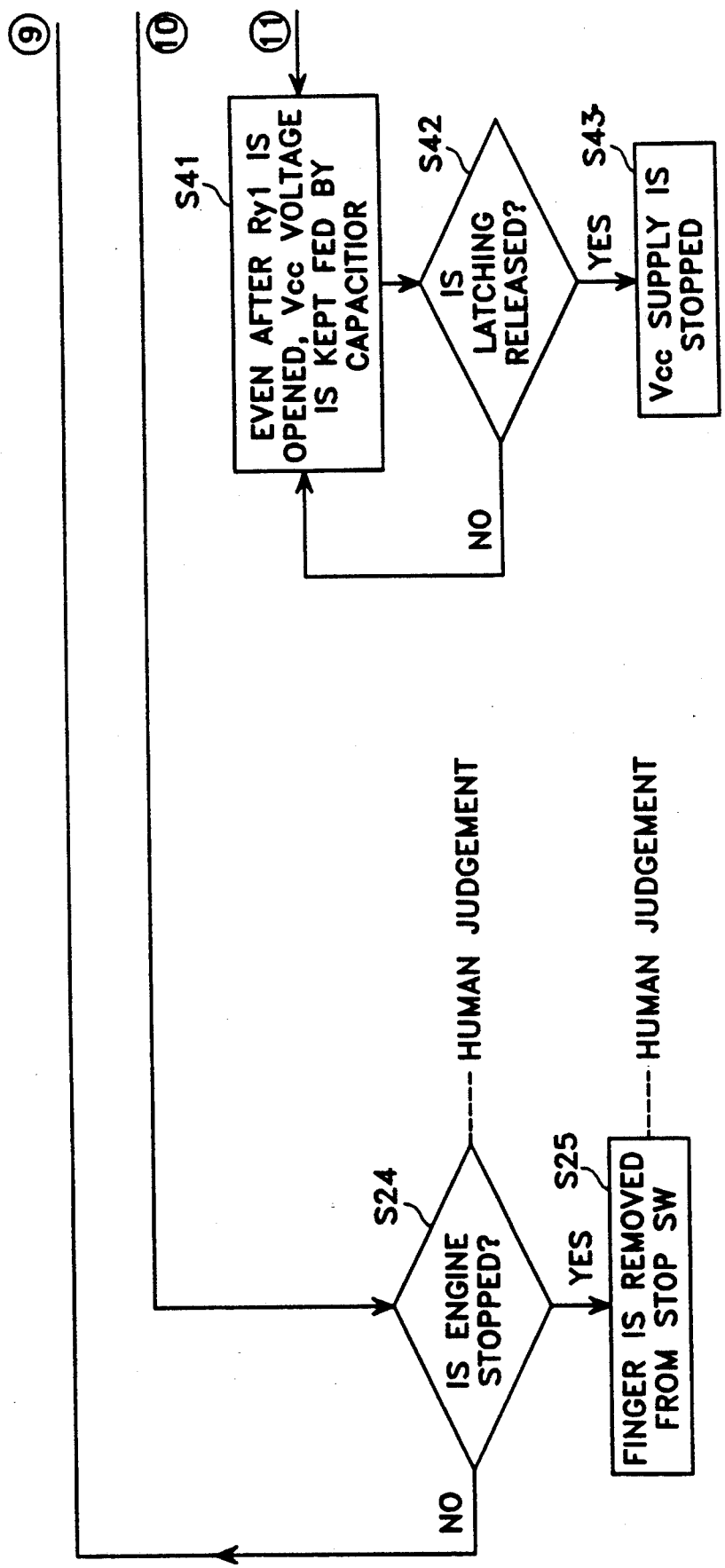

FIG. 12 is a time chart illustrating various operation patterns of an engine-driven generator using an emergency relay circuit device.

(I) of the figure shows a timing chart in which the engine is started in the state of cold engine where water temperature is below 10° C., enters the steady-state operation, and stops. It is shown, for example, that voltage is applied to the terminal SM of the starter motor to supply power voltage to the starter motor until the engine reaches approximately 850 rpm, and that voltage is applied to the choke solenoid terminal CS to control the choke to the choke solenoid side. The emergency stop circuit shown in the figure is such that power is applied to a delay circuit consisting of a resistor R25 and a capacitor C11 in the abnormal hydraulic pressure/water temperature engine-stop control circuit section 201, as described above, in the vicinity of 950 rpm of engine revolution, and the hydraulic pressure/water temperature detecting circuit is normally brought into operation after the lapse of 6 seconds. When engine revolution increases before 6 seconds are elapsed, the hydraulic pressure switch of the hydraulic pressure/water temperature switch 212 is turned off.

The start of latching operation means that power in the emergency relay circuit device is latched by the aforementioned latching circuit 207 even when the start/stop switch 217 is opened. This also indicates that engine revolution reaches approximately 1,100 rpm.

Shaded portions in the timing charts of FIG. 12 represent the ON state.

FIG. 12 (II) is a timing chart of engine start in the state of warm engine in which water temperature is above 10° C.

In this case, the self-oscillation circuit 215 in the choke changeover control circuit section 204 is operated, as described above, and voltage is alternately applied to the terminals AC and CS so as to supply the power voltage of the battery 206 alternately to the auto choke side for 2 seconds, and to the choke solenoid side for 1.5 seconds. In this way, the engine is automatically put into a ready-to-start state.

Similarly, FIG. 12 (III) is a timing chart of emergency stop at the time of an abnormal hydraulic pressure or water temperature. FIG. 12 (IV) is a timing chart of hydraulic pressure delay operation at a failure of the hydraulic pressure/water temperature switch at the time of engine start. FIG. 12 (V) is a timing chart of emergency stop at the time of an excess engine revolution. FIG. 12 (VI) is a timing chart of engine stop at a failure of power generation in the state of cold engine.

A failure of power generation in FIG. 12 (VI) means that output for a-c power or charging battery, or output for charging battery is not generated.

FIGS. 13A through 13E are flow charts of an engine-driven generator using an emergency relay circuit device of this invention.

It is assumed that the start/stop switch 217 is in the neutral state (Step 1). In this state, the contact of the relay Ry1 is in the OFF state (Step 2). When the battery is not connected in the normal polarity (Step 3), the battery reverse-connection protective circuit 208 works, breaking the contacts of the relay Ry5. So, no battery voltage is supplied to the emergency relay circuit device, and as a result, the engine is not started even when the start/stop switch 21 is thrown to the start side (Step 4).

In the state where the battery 206 is connected normally (Step 3), a check is made to see if the main switch 219 is turned on or not (Step 5), a decision is made on whether the generator is to be operated or not (Step 6).

By throwing and holding down the start/stop switch 217 to the start side (Step 7), the contacts of the relay Ry1 are closed (Step 8). This causes the start signal of the starter 213 to be generated (Step 9), closing the contacts of the relay Ry2 (Step 10). That is, when power is supplied from the battery 206 to the starter 213 via the contacts of the relay Ry2, the starter 213 operates (Step 11), causing the engine to operate, and engine revolution increases (Step 12). As engine revolution reaches 850±100 rpm (Step 13), the start/stop signal is generated (Step 14), and the contacts of the relay Ry2 are opened (Step 15), causing the starter 213 to disengage from the engine (Step 16). As a result, engine revolution further increases (Step 17).

When engine revolution reaches 1,100±100 rpm (Step 18), the latching circuit 207 begins operating (Step 19) to supply Vcc to the transistor Tr6 in the latching circuit 207 (Step 20), and engine revolution further increases and is eventually brought to a steady-state revolution of 1,800 rpm by the operation of the revolution control device, such as a mechanical governor, in the latching circuit 207 itself (Step 21).

To stop the generator (Step 22), the start/stop switch 217 is thrown and held down to the stop side (Step 23). When the engine is about to stop (Step 24), the holding down of the start/stop switch to the stop side is discontinued (Step 25), the operation of the latching circuit 20 can no longer be maintained due to reduced engine revolution, that is, the photocoupler PD in the latching circuit 207 is turned off (Step 26), and the relay Ry1 is deenergized and the contacts thereof are opened (Step 27). With this, the voltage applied to the terminal IG which has been supplying the power voltage of the battery 206 to the ignition coil via the diodes D1 and D2 of the noise elimination circuit 210 when the contacts of the relay Ry1 are closed in Step 8 (Step 51), the voltage applied to the terminal FC which has been supplying the power voltage of the battery 206 to the fuel cut-off solenoid valve (Step 52), and the voltage applied to the terminal FP which has been supplying the power voltage of the battery 206 to the fuel pump (Step 53) disappear from the terminals IG, FC and FP (Step 28). Consequently, power voltage is no longer supplied from the battery 206 to the ignition coil (Step 29), the fuel supply to the carburettor is cut off (Step 30), and the fuel pump is stopped (Step 31). That is, the engine is stopped (Step 32) and the generator stops power generation (Step 33).

When engine revolution is increased to more than 750±100 rpm in Step 12 (Step 61), the type of excitation to the field coil (FC) is changed from the separate excitation, which has been maintained by supplying the power voltage of the battery 206 to the field coil (FC) as the closing of the contacts of the relay Ry1 in Step 8 causes the transistor Tr10 in the generator initial separate-excitation circuit section 205 to turn on, causing the contacts of the relay Ry4 to close (Step 54), to the self-excitation in which the field coil (FC) is excited by the AVR 16 as the transistor Tr10 is turned off (Step 62), causing the contacts of the relay Ry4 to open (Steps 63 and 64).

When engine revolution is increased to more than 950±100 rpm (Step 65), power is supplied to the hydraulic pressure/water temperature detecting circuit shown in FIG. 4A in the abnormal hydraulic pressure/water temperature engine-stop control circuit section 201 (Step 66), and the abnormal hydraulic pressure/water temperature engine-stop control circuit section 201 is ready for operation (Step 68) after the lapse of an operation delay time set by a delay circuit consisting of a resistor R25 and a capacitor C11 (Step 67). When the water temperature sensor detects a water temperature above 110°±3° C., or the hydraulic pressure sensor detects a hydraulic pressure below 0.3±0.1 kg/mm$^2$ (Step 69), an abnormality signal is issued (Step 70), and the output of the photocoupler PD in the latching circuit 207 is dissipated (Step 26), causing the transistor Tr6 to turn off. The aforementioned flow of Steps 28 through 33 is applied to the subsequent operations.

When the contacts of the relay Ry1 are closed in Step 8, power voltage is supplied from the battery 206 to the excess revolution engine-stop control circuit section 202, making the excess revolution engine-stop control circuit section 202 ready for operation (Steps 55 and 71). If engine revolution exceeds the steady-state revolution to more than 2,300±200 rpm (Step 72), an abnormality signal is issued (Step 70). To the subsequent operations, the aforementioned flow of Step 26 and subsequent steps is applied.

When engine revolution does not increase to more than 1,100±100 rpm in Step 18, a failure of power generation occurs (Step 73), and operation is moved to Step 26.

When the contacts of the relay Ry1 are closed Step 8, the control mode of the choke for starting the engine may vary depending on whether the water temperature switch 214 is turn on or off. That is, if the water temperature sensor detects a water temperature above 10° C., the water temperature switch 214 is in the OFF state (Step 56), causing the self-oscillation circuit 215 in the choke changeover control circuit section 204 to operate. First, control is effected so that the contacts of the relay Ry3 are closed on the choke solenoid terminal CS side and opened on the choke terminal AC side (Step 81). After the lapse of 1.5 seconds (Step 82), the contacts of the relay Ry3 are reversed, opening the choke solenoid terminal CS and closing the terminal AC (Step 83), and this state is held for 2 seconds (Step 84). If no starter stop signal is issued after Step 14 (Step 85), the contacts of the relay Ry3 are changed over in accordance with the oscillation signal of the self-oscillation circuit 215 until the contacts of the relay Ry3 are reversed again, and the starter stop signal is issued (Step 85).

When a starter stop signal is issued (Step 85), the operation of the choke changeover control circuit section 204 is stopped, the contacts of the relay Ry3 are opened on the terminal CS side and closed on the terminal AC side (Step 86).

When the water temperature sensor detects a water temperature above 10° C., on the other hand, the water temperature switch 214 is in the ON state (Step 56), and the oscillation of the self-oscillation circuit 215 is stopped, causing the contacts of the relay Ry3 are closed on the terminal CS side (Step 87). This state is held until the abovementioned starter stop signal is issued (Step 88), and changed to the aforementioned Step 86 upon generation of the starter stop signal (Stop 88).

When the contacts of the relay Ry1 are opened in Step 27, the voltage Vcc generated by the closing of the contacts of the relay Ry1 in Step 8 (Step 57) is left unchanged without being attenuated by the charge stored in the capacitor (Step 41). The latching circuit 207 is instantaneously turned on until the residual voltage Vcc disappears (Step 42). Then, as the charge stored in the capacitor disappears, the voltage Vcc also disappears (Step 43).

If the contacts of the relay Ry1 are closed in Step 8 and the engine is not properly ignited (Step 58), the start/stop switch 217 is held down to the start side (Step 7), and when the engine reaches a predetermined revolution and properly ignited (Step 58), the start/stop switch 217 may be released (Step 59).

As described above, this invention having such a construction that the emergency relay circuit device is electrically isolated from the generator winding using photocouplers makes it possible to prevent ICs and other semiconductor elements from being damaged even when the emergency relay circuit device is subjected to a dielectric strength test, together with the generator.

Furthermore, by providing a protective circuit against various abnormal voltages, the emergency relay circuit device is protected against various abnormal voltages, leading to high reliability.

While specific embodiments of the invention have been shown and described in detail to illustrate the application of the principles of the invention, it will be understood that the invention may be embodied otherwise without departing from such principles.

What is claimed is:

1. An engine-driven power generating system comprising:
   an emergency relay circuit means connected to generator windings of the system and for controlling operation of the engine, said emergency relay circuit means including abnormal hydraulic pressure/water temperature engine stop control means for stopping the engine when one of abnormal hydraulic pressure or water temperature is detected, an excess revolution engine-stop control means for stopping the engine when engine revolutions exceed a predetermined value, and a stator disengagement control means for preventing the engine from being re-engaged at the time of engine start, said emergency relay circuit means and the generator windings of the system being combined together into a unit for undergoing a dielectric strength test;
   isolating means for isolating each of said control circuits from electric currents and voltages present in the generating windings during said dielectric strength test, said isolating means passing signals from the generator windings to each of said control circuits during normal operation of the engine-driven power generating system.

2. A system in accordance with claim 1, further comprising:
   battery reverse-connection means for disconnecting battery terminals from said emergency relay circuit means if said battery terminals have a reverse polarity, said battery reverse connection means including a first relay having a coil, said coil being connected in series with a diode, said coil and said diode being connected across said battery terminals, said first relay having contacts normally closed when said coil is deenergized, said battery reverse-connection means including a second relay having a coil connected in series with said contacts of said first relay, said coil of said second relay and said contacts of said first relay also being connected across said battery terminals, said second relay having contacts normally closed when said coil of said second relay is energized, said closed contacts of said second relay connecting said emergency relay circuit means to said battery, and said diode being positioned to energize said first relay when said battery terminals have a reverse polarity.

3. A system in accordance with claim 2, further comprising:

overvoltage protection means for continuously disconnecting said battery terminals from said emergency relay circuit means when a voltage above a predetermined value is applied to said battery terminals, said overvoltage protection means including a transistor in line with said coil of said second relay and said contacts of said first relay, said transistor having a base lead connected to a voltage divider circuit, said voltage divider circuit opening said transistor and deenergizing said coil of said second relay when said voltage is above said predetermined value.

4. A system in accordance with claim 1, further comprising:

noise elimination means for eliminating noises generated from an engine ignition coil, said noise eliminating means including a diode positioned in line between said ignition coil and a connection of battery terminals to said control means.

5. A system in accordance with claim 1, wherein:

said isolation means are photo-couplers which transmit signals by light waves from one end of the photo-coupler to another end of the photo-coupler.

6. An engine-driven power generating system comprising:

an emergency relay circuit means connected to generator windings of the system and for controlling operation of the engine, said emergency relay circuit means including abnormal hydraulic pressure/water temperature engine stop control means for stopping the engine when one of abnormal hydraulic pressure or water temperature is detected, an excess revolution engine-stop control means for stopping the engine when engine revolutions exceed a predetermined value, and a stator disengagement control means for preventing the engine from being re-engaged at the time of engine start, said emergency relay circuit means and the generator windings of the system being combined together into a unit for undergoing a dielectric strength test;

isolating elements for electrically isolating the generator windings from each of said control circuit means of said emergency relay circuit means;

a battery reverse-connection protective circuit for protecting each of said control circuit means of said emergency relay circuit means against reverse connection of polarity;

an abnormal overvoltage protective circuit for protecting each of said control circuit means of said emergency relay circuit means when a battery voltage exceeding a predetermined voltage level is continuously supplied; and a noise elimination circuit for eliminating noises generated from an engine ignition coil.

* * * * *